(12) United States Patent
Kaihotsu et al.

(10) Patent No.: US 9,163,698 B2
(45) Date of Patent: Oct. 20, 2015

(54) FLEXIBLE PROTECTIVE GUIDE INTERNALLY HOLDING LONG MEMBERS

(71) Applicants: DENSO WAVE INCORPORATED, Chita-gun, Aichi-pref. (JP); TSUBAKIMOTO CHAIN CO., Osaka (JP)

(72) Inventors: Kouichi Kaihotsu, Osaka (JP); Wataru Banno, Obu (JP); Takeshi Higashino, Tokai (JP)

(73) Assignees: DENSO WAVE INCORPORATED, Aichi-Pref. (JP); TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 13/621,580

(22) Filed: Sep. 17, 2012

(65) Prior Publication Data
US 2013/0075129 A1 Mar. 28, 2013

(30) Foreign Application Priority Data
Sep. 26, 2011 (JP) ................................. 2011-208573

(51) Int. Cl.
*F16L 3/015* (2006.01)
*F16G 13/16* (2006.01)
*H02G 3/04* (2006.01)
*H02G 11/00* (2006.01)

(52) U.S. Cl.
CPC .............. *F16G 13/16* (2013.01); *H02G 3/0487* (2013.01); *H02G 11/006* (2013.01)

(58) Field of Classification Search
USPC ................................ 248/49; 59/78.1; 138/110
See application file for complete search history.

(56) References Cited

U.S. PATENT DOCUMENTS

| | | | | |
|---|---|---|---|---|
| 3,517,702 A | * | 6/1970 | Trimble et al. | ............... 138/128 |
| 4,258,515 A | * | 3/1981 | Owen | ............. 52/105 |
| 5,240,209 A | * | 8/1993 | Kutsch | ............. 248/49 |
| 5,810,688 A | | 9/1998 | Hama | |
| 6,161,373 A | | 12/2000 | Heidrich et al. | |

(Continued)

FOREIGN PATENT DOCUMENTS

| | | |
|---|---|---|
| CN | A-101149090 | 3/2008 |
| DE | 197 10 489 A1 | 9/1998 |

(Continued)

OTHER PUBLICATIONS

Jul. 22, 2013 Office Action issued in Korean Patent Application No. 10-2012-0103033 (with translation).

(Continued)

*Primary Examiner* — Bradley Duckworth
(74) *Attorney, Agent, or Firm* — Oliff PLC

(57) ABSTRACT

A protective guide has a long shape and internally holds long members including at least one of flexible cables and ducts. The protective guide includes a flexible curved strip-shaped base and a plurality of flexible sectioning members. The base is made of a synthetic resin, formed into a long plate and has a longitudinal direction. The sectioning members are also made of a synthetic resin, permitted to uprise from both ends of the base and spaced apart from each other in the longitudinal direction, the both ends being opposed to each other in a direction perpendicular to the longitudinal direction. The sectioning members cooperatively define a space for accommodating the long members along the base. The base has a cross section inwardly curved toward the space, as viewed in the longitudinal direction.

16 Claims, 8 Drawing Sheets

(56) References Cited

U.S. PATENT DOCUMENTS

| | | | |
|---|---|---|---|
| 6,167,689 B1 | 1/2001 | Heidrich et al. | |
| 6,459,037 B2 | 10/2002 | Muller et al. | |
| 7,418,812 B2 * | 9/2008 | Ikeda et al. | 59/78.1 |
| 7,559,340 B2 | 7/2009 | Ikeda et al. | |
| 7,617,669 B1 * | 11/2009 | Komiya et al. | 59/78.1 |
| 7,696,434 B2 * | 4/2010 | Ruddick | 174/68.3 |
| 7,784,259 B2 * | 8/2010 | O'Rourke et al. | 59/78.1 |
| 7,942,169 B2 * | 5/2011 | Komiya et al. | 138/110 |
| 2001/0025715 A1 * | 10/2001 | Muller et al. | 174/19 |
| 2008/0017397 A1 * | 1/2008 | Komiya et al. | 174/24 |
| 2008/0066821 A1 | 3/2008 | Komiya et al. | |
| 2008/0217487 A1 | 9/2008 | O'Rourke et al. | |
| 2008/0257440 A1 | 10/2008 | Ikeda et al. | |
| 2009/0008991 A1 | 1/2009 | Ushiyama et al. | |
| 2012/0146407 A1 | 6/2012 | Ushiyama et al. | |

FOREIGN PATENT DOCUMENTS

| | | |
|---|---|---|
| DE | 697 18 074 T2 | 7/2003 |
| DE | 10 2008 016 490 A1 | 10/2008 |
| EP | 0 544 027 A1 | 6/1993 |
| EP | 0 822 353 A2 | 2/1998 |
| FR | 2 909 512 A3 | 6/2008 |
| GB | 1074804 | 7/1967 |
| JP | A-10-047441 | 2/1998 |
| JP | A-2001-514725 | 9/2001 |
| JP | A-2008-044490 | 2/2008 |
| JP | A-2010-007807 | 1/2010 |
| KR | 10-2008-0093862 | 10/2008 |
| KR | 10-1084911 B1 | 11/2011 |
| WO | WO 98/40645 A1 | 9/1998 |
| WO | WO 2004/095666 A1 | 11/2004 |

OTHER PUBLICATIONS

German Office Action issued in German Patent Application No. 10 2012 108 679.6 dated Aug. 21, 2013 (w/ translation).

Office Action dated Feb. 25, 2014 issued in Japanese Patent Application No. 2011-208573 (with translation).

Final Office Action issued in Korean Patent Application No. 10-2012-0103033 dated May 22, 2014 (w/ translation).

Jun. 13, 2014 Notification of the first Office Action issued in Chinese Patent Application No. 201210345301.9 (with English Translation).

* cited by examiner

180
FLEXIBLE PROTECTIVE GUIDE INTERNALLY HOLDING LONG MEMBERS

CROSS-REFERENCE TO RELATED APPLICATION

This application is based on and claims the benefit of priority from earlier Japanese Patent Application No. 2011-208573 filed Sep. 26, 2011, the description of which is incorporated herein by reference.

BACKGROUND OF THE INVENTION

1. Technical Field of the Invention

The present invention relates to a flexible protective guide for internally holding long flexible cables and/or ducts and guiding their behaviors to a given path, while protecting the cables and/or ducts, the cables and/or ducts connecting a fixed side of a machine in which the cable protective guide is installed to a movable side of the machine to transmit electrical signals therebetween or transfer a physical medium therebetween. In particular, the present invention relates to a long flexible protective guide preferable for an application in which cables and/or ducts are bent for connection between a fixed side of a machine in which the cable protective guide is installed and a movable side of the machine.

2. Related Art

It is well known that various machines available today are provided with a movable member, such as a linear actuator or a robot, which is connected, for actuation, to a member on a fixed side (hereinafter referred to as a fixed member) of the machine. In most of such machines, energy, such as electrical power, control signals and/or air, are required to be transferred to the movable member from the fixed member via cables and/or ducts (hereinafter just referred to as cables). Since the cables are connected between the fixed member and the movable member, it is important to guide the movement of the cables to a desired path, with the protection of the cables.

As a means for protecting and guiding such cables, a cable protective guide chain as disclosed in JP-A-H10-047441 is well known. The cable protective guide chain includes a number of link members connected in the longitudinal direction of cables. Each link member is composed of a pair of left and right link plates which are spaced apart from each other, a flap and a bottom plate. The flap is used for connecting between the upper edges of the ling plates. The bottom plate is used for connecting between the lower edges of the link plates. The movement stroke for which the chain is used is different between the users, and thus ranges from a short movement stroke to a long movement stroke. Sometimes, a long chain is required to be used for a movement stroke of 10 meters or more. Taking this into account, the cable protective guide chain disclosed in JP-A-H10-047441 achieves a required movement stroke by assembling the required number of link members and elongating the chain to the required length.

However, in exchange of the possible elongation by assembling the link plates, such an assembled cable protective guide chain involves lots of work in assembling the link plates, the flaps and the bottom plates. Further, when such an assembled cable protective guide chain is used, dust may be produced due to the friction between the link plates. In addition, when such an assembled cable protective guide chain is bent, noise may be mutually caused by the link plates. Also, such an assembled cable protective guide chain may cause vibration due to the mutual polygonal action of the link plates.

In order to take measures against these problems, JP-A-2001-514725 discloses a cable protective member. The protective member is configured by segments each of which is formed by injection-molding a synthetic resin into a flat one-piece structure. These segments are mutually connected via bendable bridges so that the protective member is foldable. Accordingly, it is no longer necessary to connect adjacent link plates and thus the assembling works are dramatically facilitated. Also, the protective member of JP-A-2001-514725 reduces production of dust, generation of noise due to bending, and vibration due to polygonal action, which are the problems of the cable protective guide chain disclosed in JP-A-H10-047441.

However, in the foldable cable protective member of JP-A-2001-514725, each segment is provided by injection-molding a synthetic resin into a one-piece flat structure. Therefore, the foldable cable protective member, when it is applied such as to a linear actuator machine having a long movement stroke, is very often difficult to manufacture with the length suitable for the long movement stroke. For example, there is a physical limitation in the size of the die used for injection molding. Further, since a desired movement stroke is different between the users, providing a plurality of dies suitable for the individual desired movement strokes invites increase in the manufacturing cost.

SUMMARY

Thus it is desired to provide a protective guide for cables and/or ducts, which eliminates such bothersome works as assembling link plates, reduces dust, bending noise and bending vibration, easily copes with movement strokes of various lengths, and smoothly holds and guides the cables and/or ducts without causing a backlash not only in a linear-posture guiding portion but also in a bent-posture guiding portion.

As an exemplary embodiment, the protective guide has a long shape and internally holds long members including at least one of a flexible cable and a flexible duct. The protective guide includes a flexible curved strip-shaped base and a plurality of flexible sectioning members. The curved strip-shaped base is made of a synthetic resin, formed into a long plate and has a longitudinal direction. The sectioning members are also made of a synthetic resin, permitted to uprise from both ends of the curved strip-shaped base and spaced apart from each other in the longitudinal direction, the both ends being opposed to each other in a direction perpendicular to the longitudinal direction. Thus, the sectioning members cooperatively define a space for accommodating the long members along the curved strip-shaped base. The curved strip-shaped base has a cross section inwardly curved toward the space, as viewed in the longitudinal direction.

In the long protective guide having such a configuration, the cables (and/or ducts) are passed through the space defined by the curved strip-shaped base and the plurality of sectioning members. One end of the protective guide is connected to a fixed member of the machine installing the protective guide, while the other end is fixed to a movable member of the machine. The cables (and/or ducts) transmit electrical power or control signals (and/or air, or the like) from the side of the fixed member to the side of the movable member. The protective guide moves following the movable member while forming a bent portion in a part of the protective guide in the longitudinal direction. With the movement of the movable member, the position of the bent portion changes in the longitudinal direction.

In the protective guide, while the bent portion changes its position with the movement of the movable member, a new portion of the protective guide in a linear posture changes into a bent posture, while a portion of the protective guide that has been in the bent posture returns to the linear posture. When the protective guide turns into the bent posture, the curve in the curved strip-shaped base is flattened, while gaps (e.g., slits) in between the plurality of sectioning members that are positioned in the bent portion each become wider, little by little, than the original width. Distortion (or strain) that would be caused when the linear posture turns into the bent posture is absorbed by the flattening of the strip-shaped base and the widening of the gaps in between the plurality of sectioning members. Thus, the space for accommodating the cables is reliably ensured in both of the linear- and bent-posture portions of the protective guide. In this way, the protective guide is able to smoothly guide the cables without causing a backlash not only in the linear-posture guiding portion but also in the bent-posture guiding portion.

Further, since the long protective guide is made of a resinous material and thus has flexibility, the assembling works, for example, of link plates as in the conventional art is no longer necessary. Also, not using link plates that are brought into contact with each other in guiding the cables can eliminate such problems as producing dust and causing bending noise and bending vibration during the guiding. In addition, a protective guide of a desired length is obtained by only cutting off the protective guide at a position in the longitudinal direction in conformity with the stroke of the movable member of the machine in which the protective guide is installed. Thus, the protective guide is able to easily respond to the applications in which the protective guide is required to have various lengths, thereby providing a good versatility.

DETAILED DESCRIPTION OF THE PREFERRED EMBODIMENTS

With reference to FIGS. 1 to 8, hereinafter is described an embodiment of a cable protective guide made of a synthetic resin, according to an embodiment of the present invention.

Figure 1:
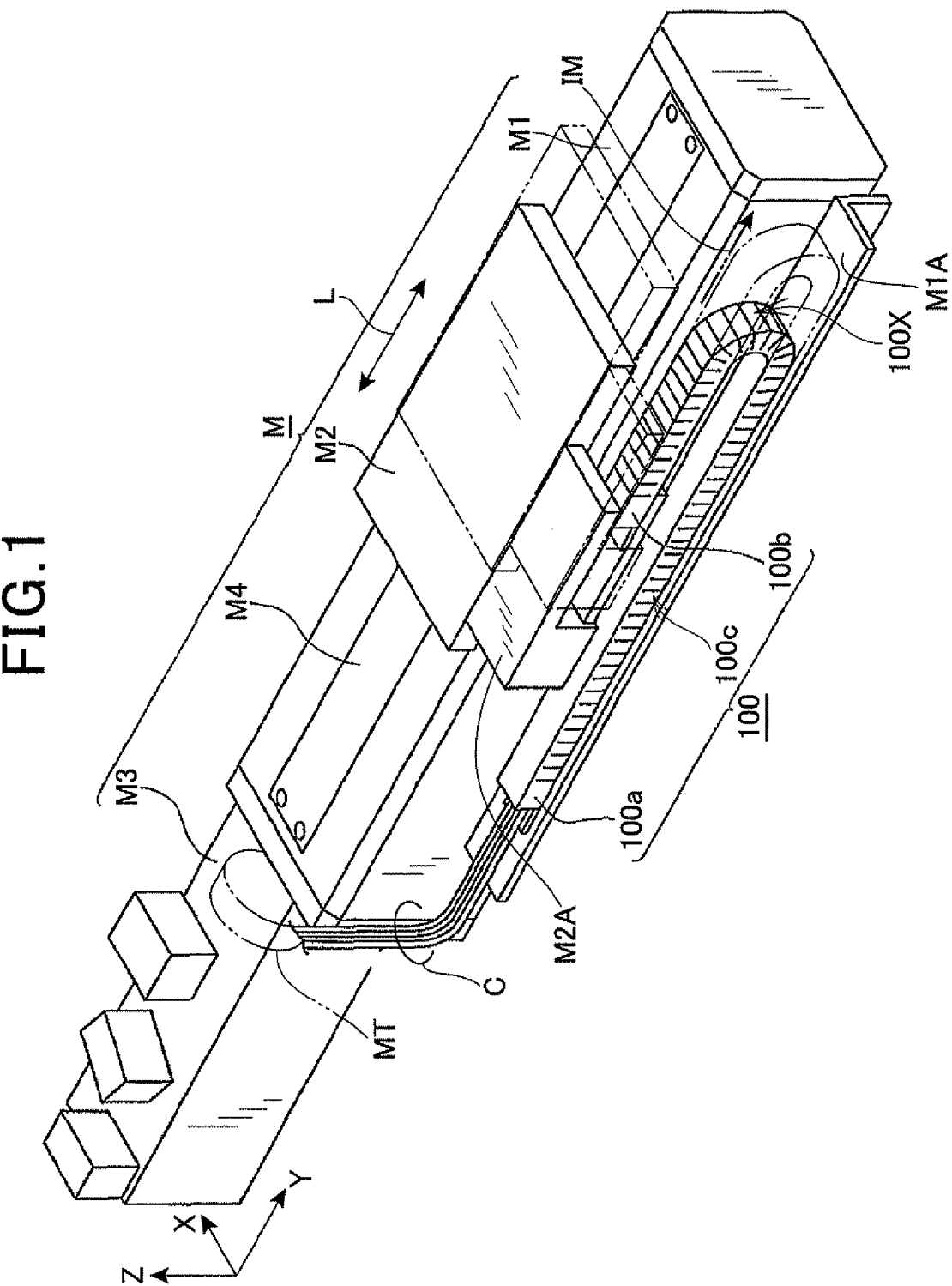
FIG. 1 is a perspective view illustrating an example of a device mounting a protective guide for cables, according to an embodiment of the present invention.

FIG. 1 is a perspective view illustrating a linear movement device M called a linear robot mounting a cable protective guide 100 according to the present embodiment.

The linear movement device M incorporates a ball-screw driven actuator. Specifically, as shown in FIG. 1, the linear movement device M includes a fixed frame M1, a movable member M2, a setting frame M3 and an actuator M4. The fixed frame M1 is provided on a machine side. The movable member M2 is a movable frame provided on the machine side. The setting frame M3 is connected to the fixed frame M1 and incorporates a drive motor MT. The actuator M4 is a ball-screw driven actuator for linearly moving the movable member M2 with respect to the fixed frame M1. Upon rotation of the drive motor MT incorporated in the setting frame M3, the actuator M4 is driven. In response to the driving, the movable member M2 is linearly moved with respect to the fixed frame M1.

As shown in FIG. 1, an X-Y-Z coordinate system is set, in which the longitudinal direction of the fixed frame M1 coincides with the Y-axis direction. The movable member M2 is allowed to reciprocally move along the Y-axis direction (see the arrow L in FIG. 1).

As shown in FIG. 1, of the two side faces of the fixed frame M1, which are opposed to each other in the X-axis direction, one is provided with a mounting plate M1A. Specifically, the mounting plate M1A having an L-shaped cross section as viewed in the longitudinal direction is secured to one of the side faces of the fixed frame M1, with a side face of the mounting plate M1A being oriented upward in the Z-axis direction. Further, of the two side faces of the movable member M2, which are opposed to each other in the X-axis direction, one is provided with a cantilever M2A. Specifically, the cantilever M2A having an upside-down L-shaped cross section as viewed in the X-axis direction is secured to one of the side faces of the movable member M2. Thus, the mounting plate M1A and the cantilever M2A are opposed to each other in the Z-axis direction on a side face of the linear movement device M. Accordingly, when the movable member M2 moves in the Y-axis direction with respect to the fixed frame M1, the cantilever M2A also moves in the Y-axis direction with respect to the mounting plate M1A (see the arrow L in FIG. 1).

The movable member M2 includes electrical and mechanical elements, such as elements that consume electrical power and electronically controlled elements, which are necessary for achieving the functions of the actuator M4. Accordingly, the actuator M4 is provided with long flexible members, such as cables/ducts C including: a cable that has ends, one being connected to the fixed frame M1 and the other being connected to the movable member M2 to supply electrical power from the side of the fixed frame M1 to the side of the movable member M2; a cable that transmits signals between the fixed frame M1 and the movable member M2; and other necessary ducts. Hereinafter, the cables/ducts C are simply referred to as cables C. The cables C move in a spatial manner with the movement of the movable member M2. Therefore, the linear movement device M includes the cable protective guide 100 which protects the cables C and guides the movement (behaviors) of the cables C within a desired path.

Specifically, as shown in FIG. 1, the cable protective guide 100 has a long shape and has ends 100a and 100b. The cable protective guide 100 has substantially a rectangular cross section perpendicular to the longitudinal direction, with substantially a rectangular hollow, as viewed in the longitudinal direction, being formed inside. The hollow serves as a path through which the cables C are permitted to move.

The cable protective guide 100 is a monolithic member entirely made of a synthetic resin. Of the ends 100a and 100b, the end 100a is fixedly attached to a predetermined position of and near the end portion of the mounting plate M1A of the fixed frame M1. On the other hand, the end 100b is fixedly attached to an end portion of the cantilever M2A of the movable member M2.

In this way, as shown in FIG. 1, the ends 100a and 100b of the cable protective guide 100 are secured to the mounting plate M1A and the cantilever M2A, respectively. The portion of the cable protective guide 100 other than the ends 100a and 100b corresponds to a trunk 100c. A part of the trunk 100c is placed on the upper surface of the mounting plate M1A. Specifically, the long cable protective guide 100 is mounted on the linear movement device M being bent forming a U-shaped bent portion 100X (part of the trunk 100c) along the Y-Z plane. Accordingly, when the movable member M2 is translated with respect to the fixed frame M1, the cable protective guide 100 is permitted to move, changing the position of the U-shaped bent portion 100X on the mounting plate M1A (see the dash-dot-dot line IM in FIG. 1).

The cable protective guide 100 has a given rigidity. Therefore, before being mounted on the linear movement device M, the cable protective guide 100 keeps its substantially linear shape in a state of being left on its own. Thus, it is true that the cable protective guide 100 is able to keep its substantially linear shape without being placed on the mounting plate M1A but, for the sake of protection from other machines or members in the factory, the cable protective guide 100 is placed on the mounting plate M1A.

The cables C are passed through the cable protective guide 100 from the side of the fixed frame M1 for connection to the movable member M2.

Referring to FIGS. 2 to 8, hereinafter are specifically described the configuration and advantages of the cable protective guide 100.

In a state where the cable protective guide 100 is mounted on the linear movement device M, the position of the U-shaped bent portion 100X is ensured to be shifted in the Y-axis direction along the Y-Z plane with the movement of the movable member M2. In order to enable this movement, the cable protective guide 100 is configured as set forth below. The cable protective guide 100 is configured as a long member having a desired length. The cable protective guide 100 has a cross section perpendicular to its longitudinal direction (the cross section along the X-Z plane in a state of being mounted on the linear movement device M). The cross section has substantially a rectangular shape with its long sides being defined by opposed upper and lower curved faces.

It is preferred that the cable protective guide 100 is a flexible monolithic member made of a synthetic resin and that its internal space having substantially a rectangular cross section functions as an accommodation space R for accommodating the cables C. In order to form the space R, the cable protective guide 100 is composed of a curved strip-shaped base 110 (hereinafter also simply referred to as a base 110) extending in the longitudinal direction of the cables C and a plurality of integrally connected substantially U-shaped wall portions (functioning as sectioning members) 120. Each U-shaped wall portion 120 is composed of side walls 121 uprising from both sides of the base 110 and a curved ceiling 122 connecting the side edges of the side walls 121.

Figure 2:
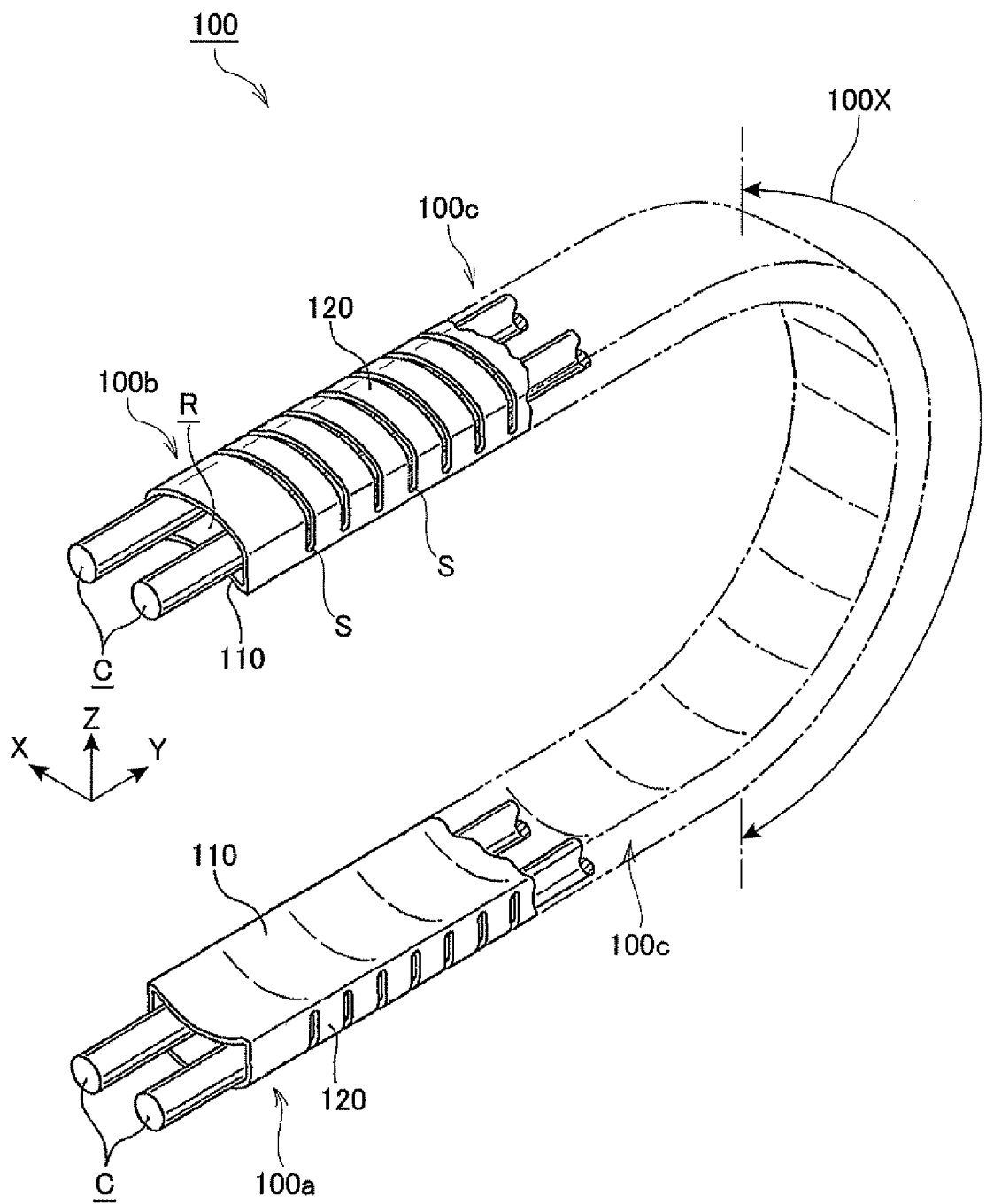
FIG. 2 is a partially omitted perspective view more specifically illustrating the general shape of the cable protective guide according to the embodiment.
Figure 4:
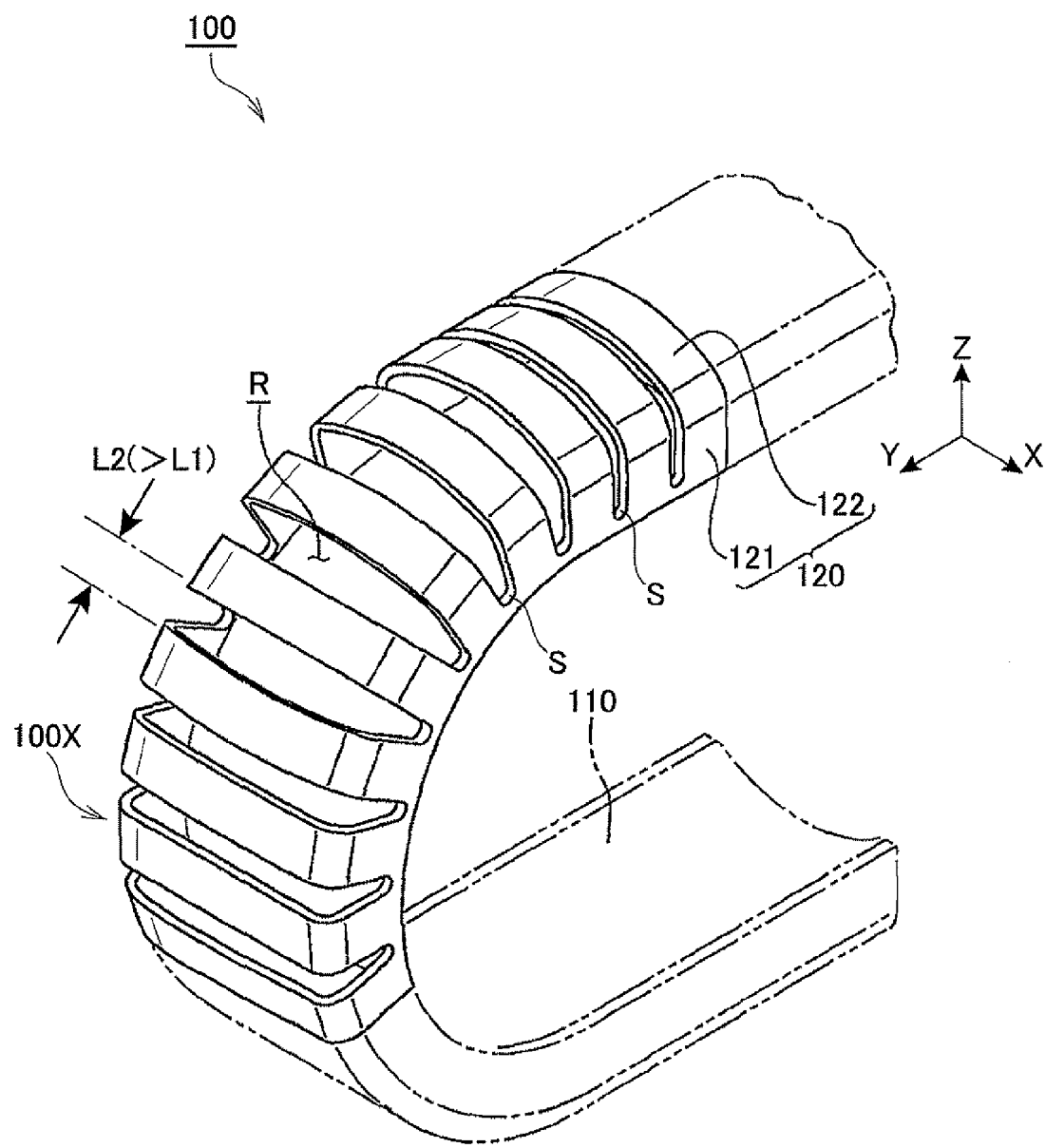
FIG. 4 is a partial perspective view illustrating a bent-posture portion of the cable protective guide according to the embodiment.
Figure 5:
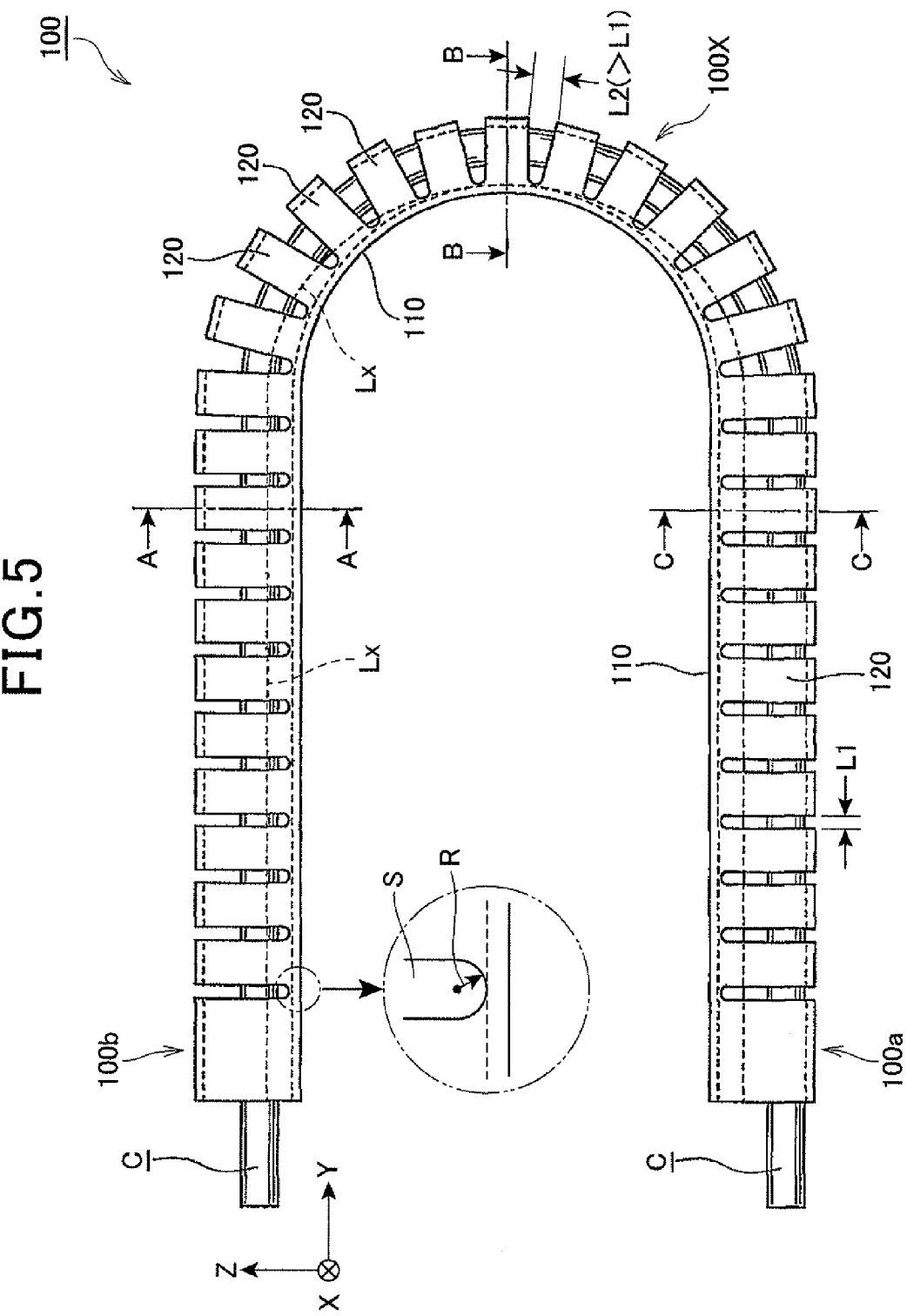
FIG. 5 is a side view illustrating in general the cable protective guide including a bent portion, according to the embodiment.

As will be understood from FIGS. 2, 4 and 5, the relationship between the base 110 and each ceiling 122 in the Z-axis direction is reversed, in the longitudinal direction of the cable protective guide 100, before and after passing the U-shaped bent portion 100X.

Figure 3:
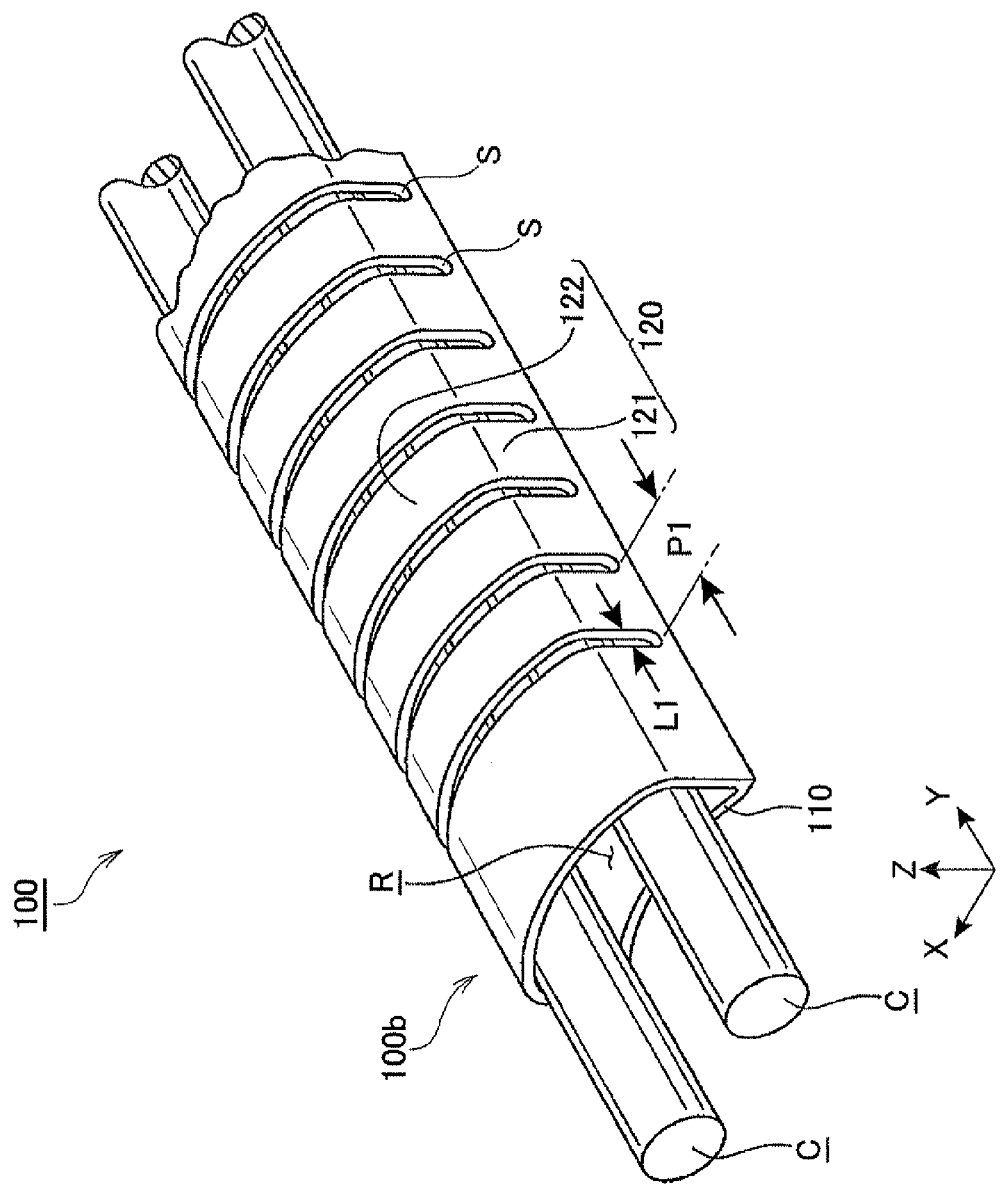
FIG. 3 is a partial perspective view illustrating a linear-posture portion of the cable protective guide according to the embodiment.

As shown in FIGS. 2 and 3, when the cable protective guide 100 is in a linear state, the plurality of wall portions (sectioning members) 120 are arranged at a fixed pitch P1 along the longitudinal direction of the base 110, being spaced apart from each other by a fixed spacing L1 corresponding to a slit S. The slits S are formed in a cutting process in the course of manufacturing the cable protective guide 100. The pitch P1 and the spacing L1 may be changed as appropriate depending on the position of the cable protective guide 100 in the longitudinal direction. However, in the present embodiment, the pitch P1 and the spacing L1 are fixedly set wherever the cable protective guide 100 may be positioned in the longitudinal direction.

As shown in FIG. 2, the base 110 and the plurality of wall portions 120 form the space R which is ensured to pass through the U-shaped bent portion 100X as well.

Figure 6:
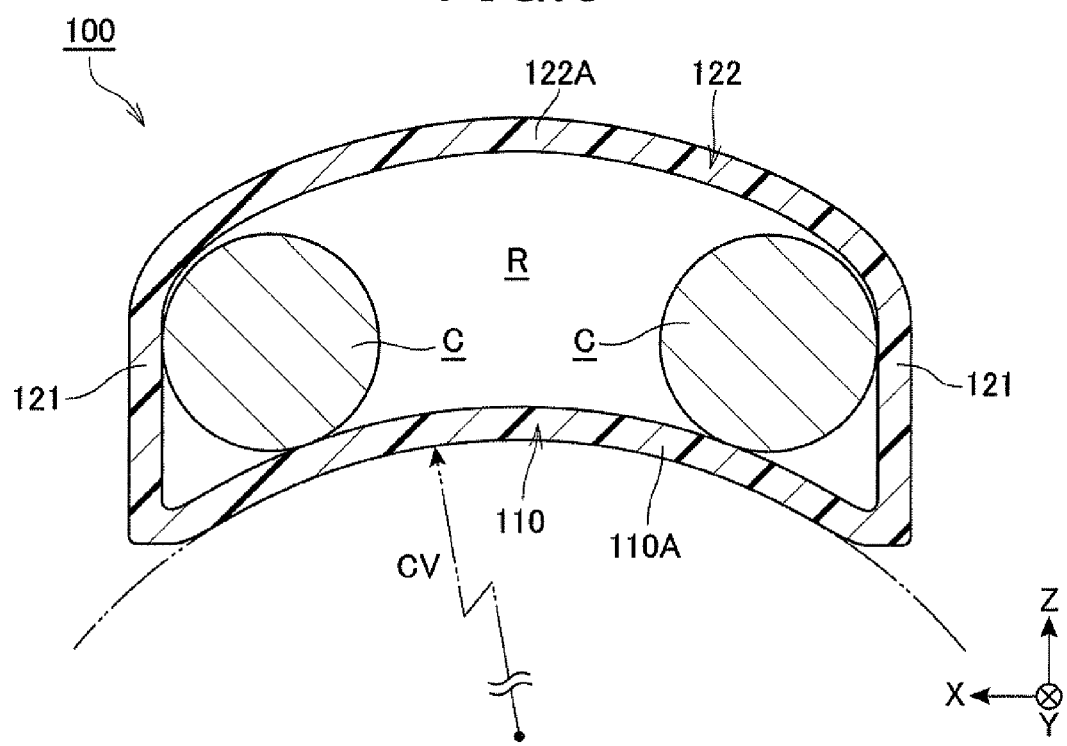
FIG. 6 is a cross-sectional view illustrating a cross section corresponding to a linear posture, taken along a line A-A of FIG. 5.

The curved strip-shaped base 110 includes a curved portion 110A which is curved, projecting from the base 110, toward the opposite face 122 (ceiling 122). Similarly, the ceiling 122 includes a curved portion 122A which is curved in a direction distancing from the base 110. The degree of curving of the curved portions 110A and 122A is ensured to be the same in the present embodiment. Accordingly, as shown in FIG. 6, the space R does not have a strict rectangular shape as viewed in a cross section along the X-Z plane. Instead, in the cross section of the space R, the walls, i.e. the base 110 and the ceiling 122, which are opposed to each other in the Z-axis direction, are curved in the same direction while being substantially parallel to each other. It should be appreciated that the degree of curving of the curved portions 110A and 122A may be different from each other depending on the conditions under which the cable protective guide 100 is used.

The curved portions 110A and 122A may be provided throughout the base 110 and the ceiling 122, respectively, along the X-axis direction, or may be partially provided such as at the respective centers of the base 110 and the ceiling 122 in the X-axis direction.

The size of the cross section of the internal space R depends on the size of the base 110 and the ceiling 122 and the size of the side walls 121. Conversely, the size of the cross section may be set according to the number, the size, the type, and the like, of the cables C desired to be passed through the cable protective guide. The degree of curving (e.g. expressed by the position of a center of curvature and a curvature radius) of the curved portions 110A and 122A of the base 110 and the ceiling 122, respectively, is determined to be the same in the present embodiment, so that the space R will have a sufficiently large size.

The material used for manufacturing the cable protective guide 100 may only have to be a synthetic resin which is able to hold long flexible members, such as cables/ducts, and is excellent in mechanical strength and molding accuracy. For example, the materials that may be used include polyolefin-based resins, such as polyethylene or polypropylene, polyamide-based resins, polyester-based resins, polyacryl-based resins, polyacetal-based resins, polyvinyl chloride-based resins and polystyrene-based resins.

In manufacturing the cable protective guide 100, a resinous material as mentioned above is processed, first, using an extruding machine or a drawing machine. Through the extruding or drawing process, a monolithic tubular member is prepared in which the curved strip-shaped base 110 is integrated with the plurality of wall portions 120 in series. In this case, the die used in the processing machine is formed so that the die can form the base 110 and the ceilings 122 together with the curved portions 110A and 122A, respectively.

The tubular member prepared in this way is processed using a slicer so that, as shown in FIG. 3, the slits S are formed at the predetermined pitch P1 with the predetermined spacing L1 being formed in each pitch P1. Each of the slits S is formed throughout the height of each wall portion 120 and has a depth, or a dead end, reaching the base 110. As shown in FIG. 5, the dead end of each slit S has a rounded portion R (see reference R).

In the cable protective guide 100 configured in this way, when the movable member M2 linearly moves in the Y-axis direction with respect to the fixed frame M1, the end 100b also moves in the Y-axis direction. With this movement, the position of the bent portion 100X of the cable protective guide 100 changes in the Y-axis direction.

As shown in FIG. 6, in the cable protective guide 100, its linear-posture portion has a substantially rectangular cross section along the X-Z plane, with both of its long sides being curved. However, as the bent portion 100X moves and approaches the linear-posture portion, several slits S in the vicinity of the bent portion 100X begin to open wider than the spacing L1 maintained up to then. Then, upon arrival of the bent portion 100X, the slits S open as wide as a predetermined spacing L2 (>L1). Thus, as the slits S are widened, the distortion (or strain) caused by the bending of the bent portion 100X is absorbed by the elastic deformation. In this case, as shown in FIGS. 4 and 7, the cross section of the bent portion 100X perpendicular to the longitudinal direction, i.e. the cross section along the X-Z plane, is flattened to show a more rectangular shape.

Figure 7:
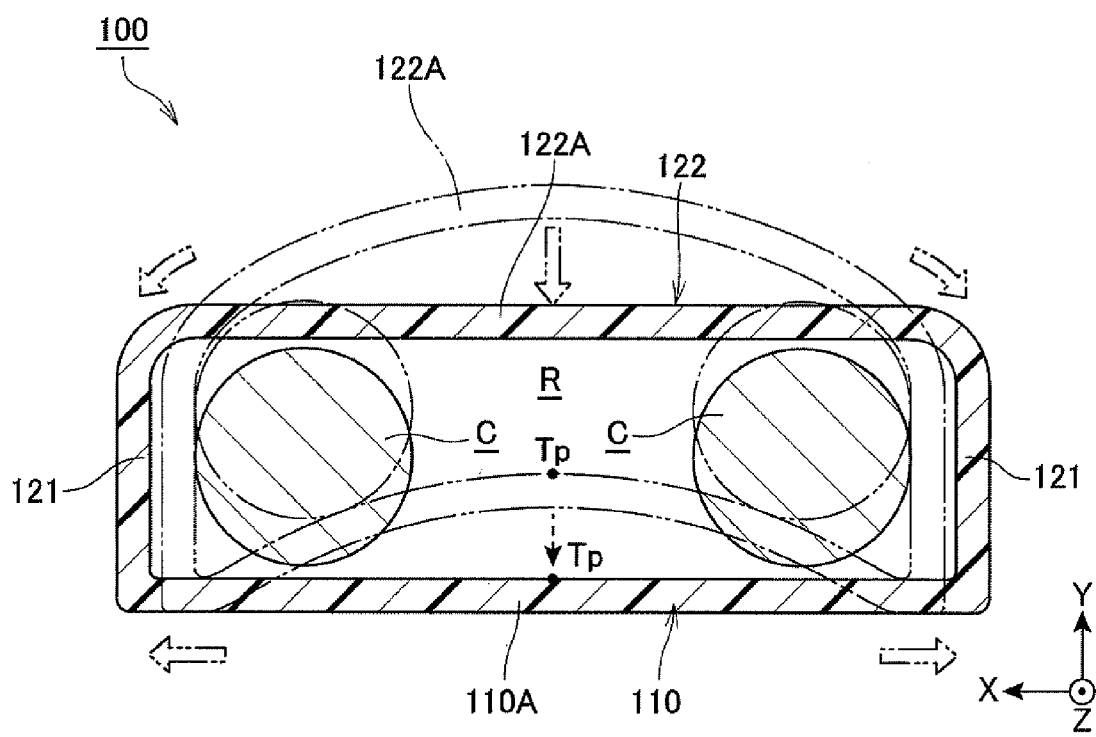
FIG. 7 is a cross-sectional view illustrating a cross section corresponding to a bent posture, taken along a line B-B of FIG. 5.

In other words, as indicated by the solid line in FIG. 7, the base 110 and the ceiling 122 (curved portions 110A and 122A) are flattened, compared to the cross section in the linear-posture portion as shown in FIG. 6. In this way, as the slits S are widened and as the upper and lower curved portions 110A and 122A are flattened, the components of the cable protective guide 100 are able to disperse their distortion (or strain) caused by the bending. At the same time, the cable protective guide 100 is able to smoothly turn its posture from linear to bent. Since such a smooth bending is enabled in the cable protective guide 100, the cables C accommodated in the internal space R are guided in harmonization with the movement of the space R (path), while being protected by the cable protective guide 100. Thus, the movable member M2 as well is able to move in a smooth manner.

By the way, in FIG. 5, a dashed line Lx (which should be drawn partly by two-dot chain lines in FIG. 5) shows how the top position TP of the curved portion 110A (refer to FIG. 7) changes in its Z-axial height as advancing from the linear posture to the curved posture along the longitudinal positions of the cable protective guide 100.

The cable protective guide 100 exerts various advantages.

First of all, the cable protective guide 100 can eliminate the necessity of preparing a cable protective guide on the worksite by assembling members as in the conventional art. In the cable protective guide 100 according to the present embodiment, the curved strip-shaped base 110 and the plurality of wall portions 120 are formed as a monolithic member. Therefore, the assembling workload as mentioned above is eliminated and thus the working efficiency is enhanced accordingly.

The slits S are formed at the even pitch P1 throughout the cable protective guide 100 in its longitudinal direction. Thus, the cable protective guide 100 may be cut off at any slit S so as to match the length of the accommodated cables C. In other words, the cable protective guide 100 only has to be cut off according to the application. Thus, there is no necessity of preparing various types of cable protective guides in advance. Accordingly, only a simple workload on the worksite can provide the cable protective guide 100 of a desired length. In this way, the cable protective guide 100 having good general-purpose properties can be provided.

Further, since the cable protective guide 100 is formed using extruding or drawing, the curved strip-shaped base 110 has a high degree of molecular orientation in the longitudinal direction. In this way, the cable protective guide 100 has high fatigue strength in the longitudinal direction and thus has an excellent durability as well accordingly.

Moreover, in performing extruding or drawing, the thickness and size can be changed in the base 110 and/or the wall portions 120 of the cable protective guide 100. In addition, the material for forming the cable protective guide 100 can be selected as appropriate. In this way, in guiding the cables C with the protection thereof, an optimum mode of a path, i.e. the space R, is obtained in conformity with the type and the number of the cables C desired to be accommodated.

Further, use of a synthetic resin material in manufacturing the cable protective guide 100 enables continuous processing using extruding or drawing, while ensuring a steady mode in the space R for accommodating the cables C.

Figure 8:
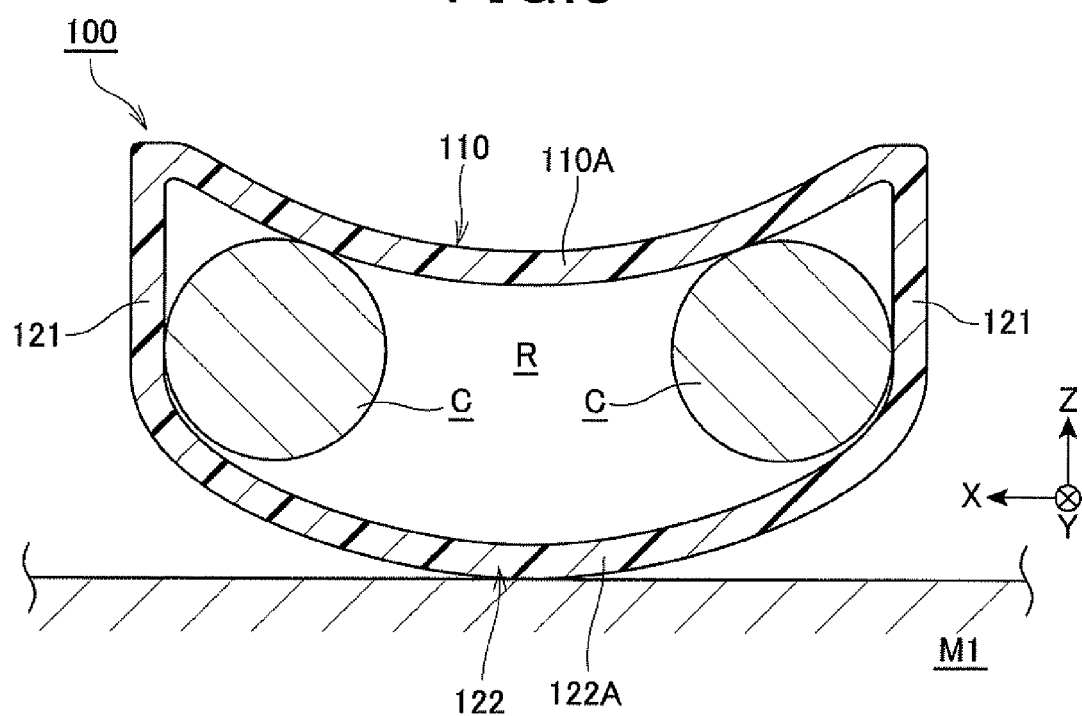
FIG. 8 is a cross-sectional view illustrating a cross section corresponding to another linear posture, taken along a line C-C of FIG. 5.

Further, as shown in FIGS. 6 and 8, the base 110 has the curved portion 110A as far as the cable protective guide 100 maintains its linear posture. Accordingly, a space SP having a slightly sharp-angled cross section is formed between an uprising portion at each end of the curved portion 110A and each side wall 121. Therefore, at least a part of the cables C is accommodated in each of the narrow spaces SP. The sharp-angled spaces SP have high rigidity owing to the shape, wall thickness, and the like. The high rigidity serves as a support for the cables C in the longitudinal direction. Thus, in guiding the cables C in the linear-posture portion of the cable protective guide 100, the linear posture of the cables C is reliably maintained.

As described above, in the present embodiment, the shape and size of the curved strip-shaped base 110 and the wall portions 120 are set so that the space R is sufficiently ensured for the accommodation of the cables C. This acts synergistically with the structure unique to the present embodiment. Specifically, the cable protective guide 100 (i.e. the cables C) constantly has, in the space R: a portion in which the cables C keep a linear posture; a portion in which the posture of the cables C turns from linear to bent; a portion in which the cables C keep a bent posture; a portion in which the posture of the cables C turns from bent to linear again; and a portion in which the posture of the cables C returns to linear again. In the present embodiment, the portions involving the bent posture exert an effect of allowing the slits S to absorb the distortion (or strain) caused by the bending and an effect of flattening the curved portions 110A and 122A.

As described above, the cable protective guide 100 has, in the space R, a portion in which the cables C keep a linear posture or a portion in which the cables C keep a bent posture. Between these portions, there is not so much a significant change in the shape and size of the space R, except the change that the curved portions are flattened. Thus, the present embodiment provides an appropriate model which is able to accept both of the linear and bent postures of the cable protective guide 100, with the space (path) R being fully ensured inside. Accordingly, the space R in the model is able to suppress a backlash accompanying the movement of the cables C.

Specifically, as described above, the position of the U-shaped bent portion 100X changes with the movement of the movable member M2. Thus, wherever the bent portion 100X may be positioned, the cable protective guide 100 is able to constantly enclose the cables C and guide the movement of the bent portions of the cables C.

Further, when a plurality of cables C are accommodated in the space R, the curved portions 110A and 122A in the linear-posture portion of the cable protective guide 100 can exert their function of fixing the accommodation positions of the plurality of cables in the space R. Specifically, the inclinations of the curved portions 110A and 122A exert a function of preventing the plurality of cables C accommodated in the space R from moving spontaneously in the direction along the X-Z plane (movement of crossing the cables C). More specifically, during the operation of the linear movement device M, the positions of the cables C along the X-Z plane remain as they are initially accommodated in the space R. For this reason, the plurality of cables C are suppressed from interfering with each other or suffering from contact friction. Thus, the cable protective guide of a smooth and stable movement is realized.

Further, the plurality of wall portions 120 having an identical shape are arranged at an even pitch along the longitudinal direction of the curved strip-shaped base 110. This configuration allows the cable protective guide 100 to more effectively exert its function of widening the width of the slits S and flattening the curved portions 110A and 122A. As a result, with the movement of the movable member M2, the position of the U-shaped bent portion 100X is shifted in the Y-axis direction, while the U shape of the sole bent portion 100X is reliably maintained. Thus, the cables C are protected and guided in a stable manner.

Furthermore, the plurality of wall portions 120 are spaced apart from each other by the slits S. The base portion, i.e. the dead end, of each of the plurality of slits S reaches the curved strip-shaped base 110. This configuration much more enhances the effect of absorbing distortion (or strain) caused by the bending in the bent portion 100X. Thus, the bent portion 100X may have only a smaller curvature radius. For this reason, the space occupied by the cable protective guide 100 is made smaller.

In addition, since the dead end of each slit S has the rounded portion R, the distortion (or strain) applied to the base portion (dead end) of each slit S is effectively and evenly dispersed in the periphery. Thus, the durability of the cable protective guide 100 is enhanced.

The cable protective guide 100 of the present embodiment is configured and functions as described so far. Accordingly, advantageous effects different from those of the guide structures of conventional art are obtained as set forth below.

The assembling work for providing the conventional link-plate structure is no longer necessary. The cable protective guide 100 is able to prevent production of dust that would have been produced in the conventional structure when a pin between the link plates slides in a pin hole causing a frictional damage. Further, the cable protective guide 100 is able to prevent occurrence of intermittent bending noise that would have occurred in the conventional structure due to the collision between stopper members that limit the bending angle between the link plates when they are bent. In addition, the cable protective guide 100 is able to prevent occurrence of intermittent bending vibration that would have occurred in the conventional structure accompanying the polygonal action between the link plates.

The cable protective guide 100 of the present embodiment is advantageous as well when compared to a foldable cable protective structural member having a bridge structure of conventional art in which segments are connected to each other via bridges. Specifically, whatever length the space R may be required to have, the cable protective guide 100 is manufactured as a monolithic component using integral and continuous molding. Accordingly, the work of assembling segments, for example, is no longer necessary. For example, a cable protective structural member, when it is used in a linear actuator machine, is required to have a large length so as to follow the stroke of the actuator shaft. Such a long cable protective structural member can also be manufactured according to the present embodiment.

The long flexible cable protective guide of the present invention is used as a cable protective guide for accommodating cables (and/or ducts) that connect between a fixed member and a movable member of a machine installing the cable protective guide. The cable protective guide particularly exerts its advantages when used being bent in its longitudinal direction. As far as the cable protective guide is used in this way, there is no particular limitation in the machines in which the cable protective guide is installed. For example, the cable protective guide can be installed such as in working machines, production machines, power transmission machines, measuring machines, conveying machines and robots.

Figure 9:
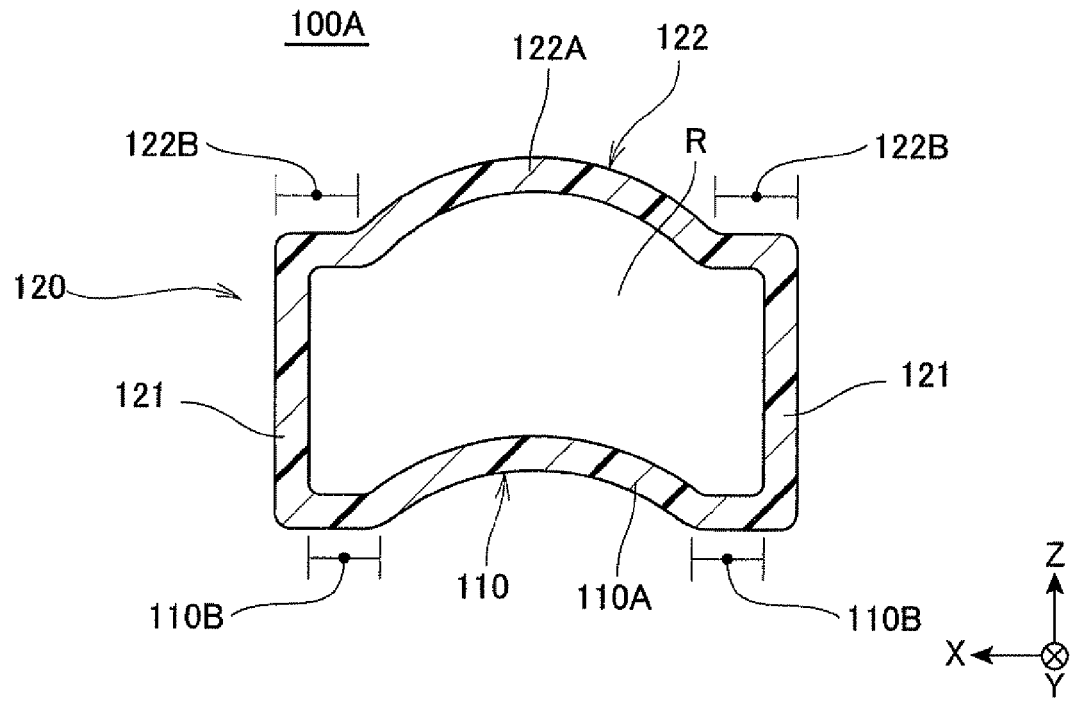
FIG. 9 is a cross-sectional view along a plane perpendicular to the longitudinal direction of a cable protective guide as a modification of the present invention.
Figure 10:
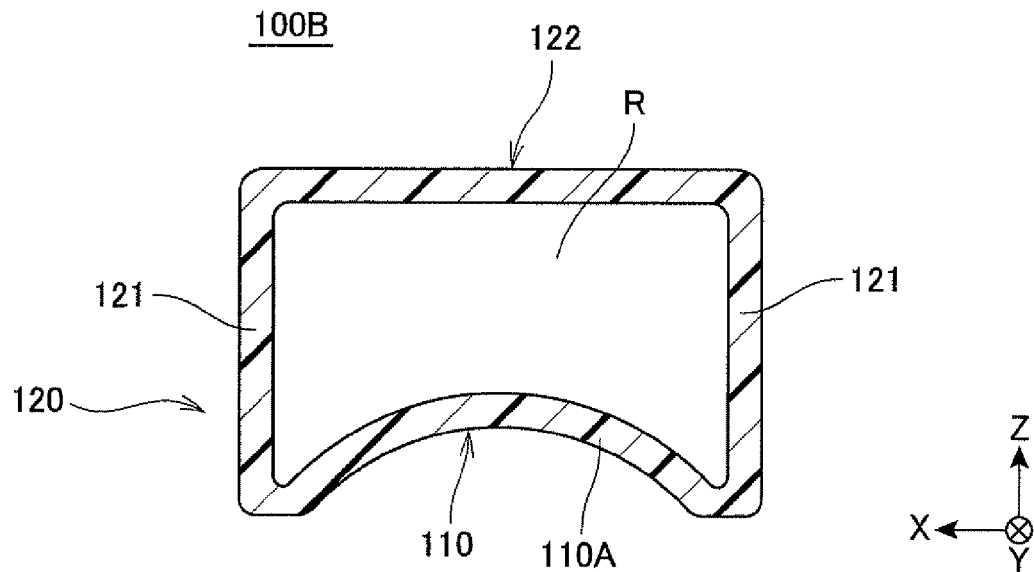
FIG. 10 is a cross-sectional view along a plane perpendicular to the longitudinal direction of a cable protective guide as another modification of the present invention.

The cable protective guide of the present invention is not necessarily limited to the one having the structure as described above. For example, the cable protective guide may have the cross-sectional structure as shown in FIG. 9 or 10. In a cable protective guide 100A shown in FIG. 9, the base 110 and the ceiling 122 are provided on their both sides with small non-curved or flat portions 110B and 122B, respectively, in the X-axis direction. In a cable protective guide 100B shown in FIG. 10, only the base 110 has a curved portion 110A, while the ceiling 122 is provided as a flat wall. When the cable protective guide 100A or 100B is in a bent posture, the cross section as viewed in the longitudinal direction may be slightly distorted (or strained). However, the slits S spacing apart the plurality of wall portions 120 from each other and the curved portion 110A of the base 110 effectively exert their functions to thereby reliably guide the cables C in both of linear and bent postures.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A flexible protective guide internally holding elongated members that include at least one of a flexible cable and a flexible duct, the protective guide comprising:

a flexible strip-shaped base made of a synthetic resin and formed into an elongated plate shape having a longitudinal direction along which the guide is allowed to move; and a plurality of flexible sectioning members made of the synthetic resin and integrally formed with the flexible strip-shaped base, the flexible sectioning members being provided with side walls and ceilings which cooperatively define a space together with the strip-shaped base, the side walls of each of the flexible sectioning members rising respectively from both lateral side ends of the snip-shaped base, the lateral side ends being located in the lateral direction perpendicular to the longitudinal direction, the ceiling of each of the flexible sectioning members bridging the side walls of each of the flexible sectioning members such that the ceiling is opposed to the strip-shaped base with the space left between the ceiling and the strip-shaped base, the side walls and the ceilings of the flexible sectioning members being separated from one another by slits in the longitudinal direction, the elongated members being accommodated in the space, wherein:

the strip-shaped base is formed to have a cross section perpendicularly crossing the longitudinal direction, the strip-shaped base being (1) curved to project toward the space in the cross section when the guide moves along a linear path in the longitudinal direction and (2) deformed to be flattened when the guide moves along a curved path in the longitudinal direction.

2. The protective guide according to claim 1, wherein the cross section of the strip-shaped base has a contour bilaterally symmetrically curved from both of the lateral side ends of the strip-shaped base when the guide moves along the linear path.

3. The protective guide according to claim 2, wherein the ceiling is curved in the same direction as the curve of the strip-shaped base such that, when being viewed in the longitudinal direction, the space provides a curved rectangular shape when the guide moves along the linear path and the space provides an approximately rectangular shape when the guide moves along the curved path.

4. The protective guide according to claim 3, wherein the base, and the side walls and the ceiling forming each of the plurality of sectioning members are integrally formed with each other and made of the same resinous material.

5. The protective guide according to claim 4, wherein the plurality of sectioning members are formed from a monolithic tubular member in which the strip-shaped base and the space are formed.

6. The protective guide according to claim 5, wherein the slits are provided at even intervals in the longitudinal direction to uniform the length of the plurality of sectioning members in the longitudinal direction.

7. The protective guide according to claim 6, wherein each of the plurality of slits have, dead ends respectively reaching the strip-shaped base in the lateral direction, the dead ends being rounded toward the strip-shaped base.

8. The protective guide according to claim 5, wherein each of the plurality of slits have dead ends respectively reaching the strip-shaped base in the lateral direction, the dead ends being rounded toward the curved strip-shaped base.

9. The protective guide according to claim 1, wherein the ceiling is curved in the same direction as the curve of the strip-shaped base such that, when being viewed in the longitudinal direction, the space provides a curved rectangular shape when the guide moves along the linear path and the space provides an approximately rectangular shape when the guide moves along the curved path.

10. The protective guide according to claim 9, wherein the strip-shaped base, and the side walls and the ceiling forming each of the plurality of sectioning members are integrally formed with each other and made of the same resinous material.

11. The protective guide according to claim 10, wherein the plurality of sectioning members are formed from a monolithic tubular member in which the strip-shaped base and the space are formed.

12. The protective guide according to claim 11, wherein the slits are provided at even intervals in the longitudinal direction to uniform the length of the plurality of sectioning members in the longitudinal direction.

13. The protective guide according to claim 12, wherein each of the plurality of slits have dead ends respectively reaching the strip-shaped base in the lateral direction, the dead ends being rounded toward the strip-shaped base.

14. The protective guide according to claim 1, wherein the plurality of sectioning members are formed from a monolithic tubular member in which the strip-shaped base and the space are formed.

15. The protective guide according to claim 14, wherein the slits are provided at even intervals in the longitudinal direction to uniform the length of the plurality of sectioning members in the longitudinal direction.

16. The protective guide according to claim 15, wherein each of the plurality of slits have dead ends respectively reaching the strip-shaped base in the lateral direction, the dead ends being rounded toward the curved strip-shaped base.

* * * * *